March 18, 1924.  
W. KRAUSE  
PIPE JOINT  
Filed Sept. 29, 1921  
1,487,517  
2 Sheets-Sheet 1
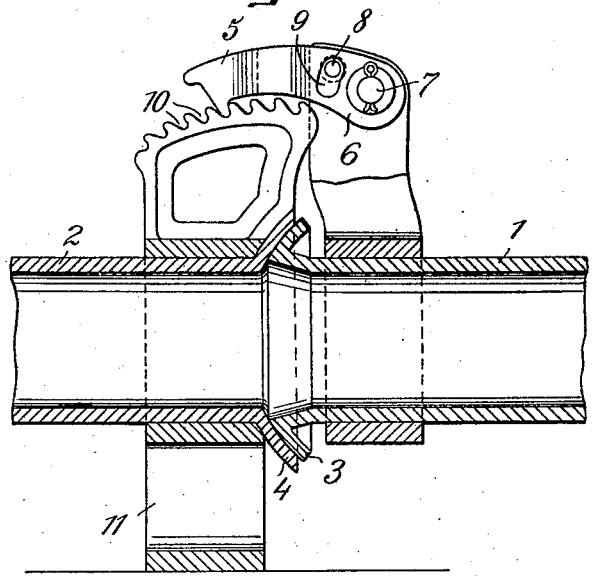
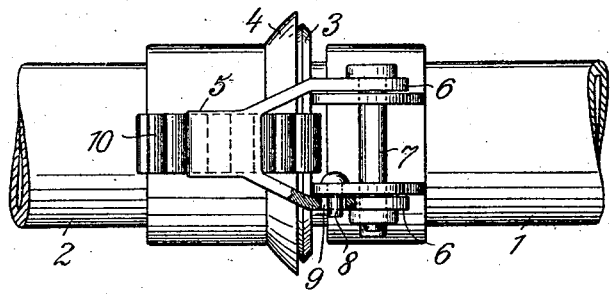
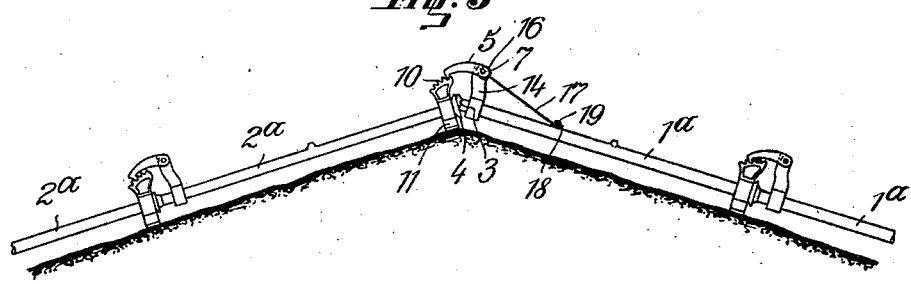
Witnesses:
Inventor:  
Walter Krause

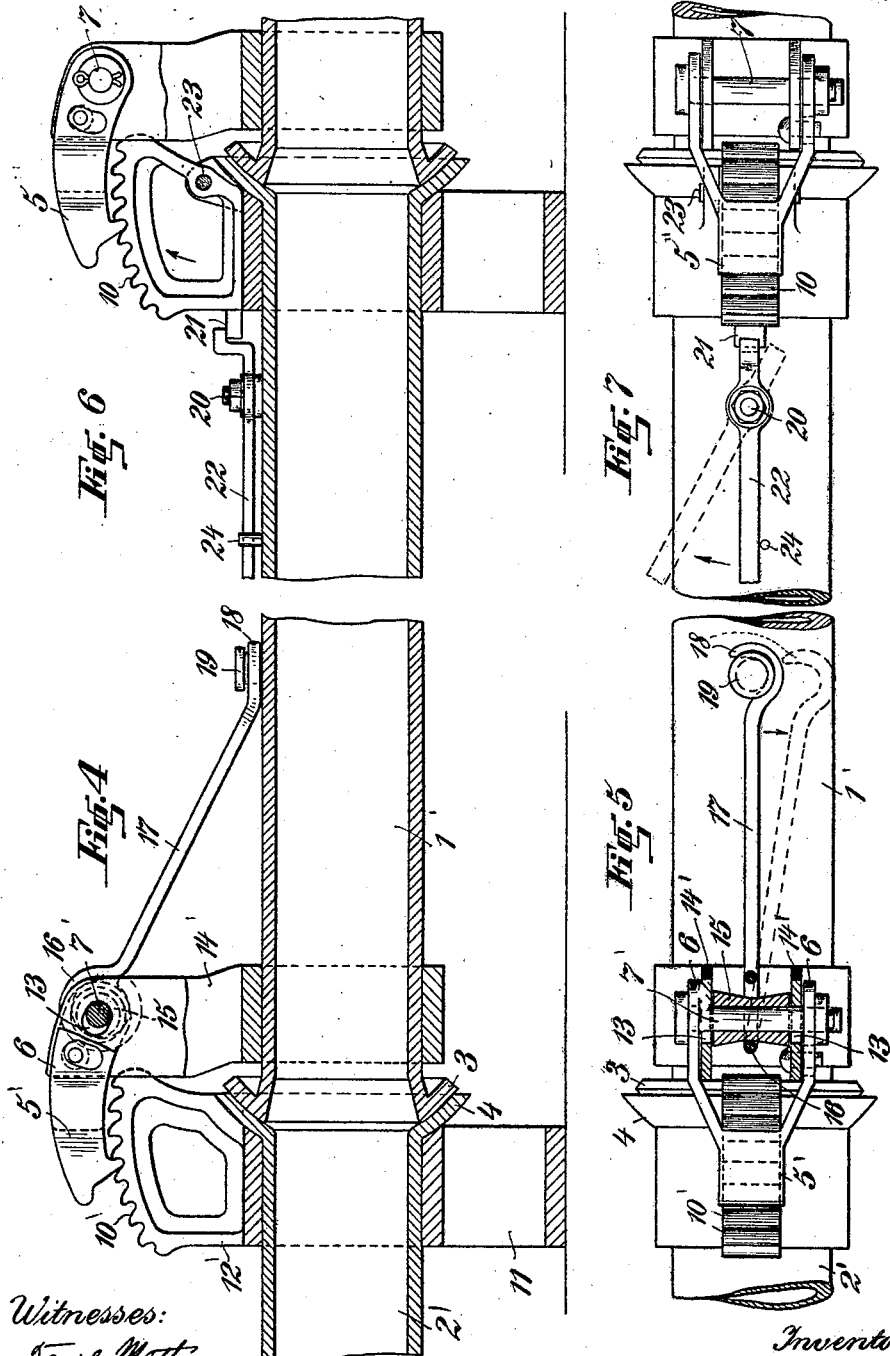

Patented Mar. 18, 1924.

1,487,517

UNITED STATES PATENT OFFICE.

WALTER KRAUSE, OF BERLIN-ZEHLENDORF, GERMANY.

PIPE JOINT.

Application filed September 29, 1921. Serial No. 504,177.

*To all whom it may concern:*

Be it known that I, WALTER KRAUSE, a citizen of Germany, and resident of Berlin-Zehlendorf, Germany, have invented certain new and useful Improvements in Pipe Joints, of which the following is a specification.

My invention relates to improvements in pipe joints, and more particularly in joints for pipe systems in which the pipes are supported on the ground or on a suitable foundation with one of their ends while the opposite end of each pipe is supported on the adjacent pipe and so connected therewith as to be readily disconnected therefrom and to provide a fluid-tight joint by gravity. One of the objects of the improvements is to provide a joint which can readily be made or unmade without lifting the pipes to an undue height. Another object is to provide a joint in which the exact relation between the connecting means and the abutting surfaces and an exact fashioning of said abutting surfaces is not required for obtaining a tight joint. With these and other objects in view my invention consists in providing the pipes at their ends with members adapted for locking engagement with each other at least one of which is movable transversely of the axis of the pipes and into and out of locking engagement with the other member. More particularly, where the said members consist of a hook member and a member in the form of a rack respectively disposed on the adjacent pipe ends, the rack or hook member or both of them are mounted for rocking transversely of the pipes. Therefore when assembling the pipes the rocking member is adapted to be slipped over the cooperating member until the portions of the members corresponding to the desired angular relation of the pipes are in engagement with each other. When thus assembling the pipes the pipe to be suspended from the supported pipe need not be raised so high as in the case of pipes in which the locking members are rigidly secured, which is particularly important in case of long and heavy pipes. Furthermore, by having one or both of said members movable the abutting pipe ends are brought into uniform contact by gravity. An important advantage of the improvement resides in that the joint can be so constructed that any of the pipes of the system can be disconnected without first disconnecting the adjacent pipes, while in systems of this type such as are now in use the pipes can be disconnected only one after the other and beginning at one end of the system.

For the purpose of explaining the invention several examples embodying the same have been shown in the accompanying drawings, in which the same reference characters have been used in all the views to indicate corresponding parts.

In said drawings,—

Fig. 1, is a vertical longitudinal section of the adjacent ends of two pipes and showing the supporting means for one of the pipes and the means for connecting therewith the other pipe, Fig. 2, is a plan view of Fig. 1 with parts in section, Fig. 3, is a side view of a part of the system designed for use in irrigation systems, Fig. 4, is a vertical longitudinal section of two pipe ends showing a modification, Fig. 5, is a plan view of Fig. 4 with parts in section, and Figs. 6 and 7, are respectively a vertical longitudinal section and a plan view showing a further modification.

Referring now to the example shown in Figs. 1 and 2, the pipes 1 and 2 to be connected with each other are provided at their adjacent ends with spherical flanges 3 and 4 adapted to form a tight joint with each other. The pipe 1 is provided at its end with a locking member 5 in the form of a hook bifurcated at its rear end at 6 and rockingly mounted on a pivot bolt 7 secured to a bracket 14. Preferably means are provided for limiting the rocking movement of the hook, which means consist of a pin 8 engaging in a slot 9 made in one of the rear arms 6 of the hook. The cooperating pipe 2 is provided with a locking member 10 in the form of a sector 12 formed with ratchet teeth 10. As shown the pipe 2 is supported by means of a foot member 11, and the pipe 2 is suspended with its hook 5 from the toothed sector 10.

In some cases, for example in irrigation systems, it is desirable to construct the joint in such a way, that the pipes can be disconnected at any part of the system without first removing the adjacent pipes. Fig. 3 shows a system in which two pipes 1 and 2 are inclined relatively to each other at an obtuse angle, the joint being located for example at the top of a hill. In this case the hook member 5 of the pipe 1ª suspended from the pipe 2ª transmits the weight of the pipe 1ª to the member 12' provided with ratchet teeth 10, whereby considerable tension is produced in the locking members. Therefore, the hook member 5 can ordinarily be disengaged from the toothed member 10 only by lifting the end of the pipe carrying the same, so that all the pipes beginning from one end of the system must first be disconnected.

In order that the joint located in Fig. 3 at the top of the hill can be loosened independently of the other pipes of the system I mount one or both of the locking members on the adjacent pipe ends so as to be shiftable axially of the pipes, so that the parts of the joint can be disengaged from each other by moving the pipe ends laterally.

In the example shown in Fig. 3 this is particularly important for the reason that when dismounting the pipe system at first at the top and gradually proceeding to the lower ends thereof the water contained within the pipes is successively discharged at the pipe ends. When beginning the dismounting at the lower parts of the system the whole volume of the water would flow on the ground at one point, thus producing holes in the soil.

The improved joint used in Fig. 3 is shown by way of example in Figs. 4 and 5. As shown, the bolt 7' is mounted in slots 13 of a bifurcated bracket 14' secured to the pipe. Between the bifurcated portions of the bracket 14' a sleeve 15 is located which flares outwards from its middle to both sides, which sleeve embraces the bolt 7' and is engaged by an eye 16 provided at one end of a rod 17, the opposite end of which is in the form of a hook 18 engaging a pin 19, secured to the wall of the pipe 1'. Ordinarily the rod 17 is in the position shown in Fig. 5 in full lines in which it engages with its hook 18 the pin 19 and forces the pivot bolt 7' into contact with the right hand end walls of the slots 13. If it is desired to disengage the hook member 5' from the toothed member 12' without lifting the pipe 1' or shifting the pipe 2', the rod 17 is rocked laterally and into the position shown in Fig. 5 in broken lines in which it is disengaged from the stud 19. Therefore the pivot bolt 7' can be moved within the slots 13 and towards the toothed member 12', so that the clearance of the hook member is sufficient to permit the same to be rocked away from the teeth 10', whereupon the ends of the pipes 1' and 2' can be moved laterally and out of engagement with each other.

In the modification shown in Figs. 6 and 7 the toothed member 12" is mounted for rocking on a pivot bolt 23, and it is adapted to be locked in position by means of a rocking lever 22 mounted on a stud 20 and engaging a lug 21 of the member 12". By rocking the toothed member 12" towards the hook member 5" the latter can be moved out of engagement with the teeth of the member 12". The movement of the lever 22 into locking engagement with the lug 21 is limited by a pin 24.

While in describing the invention reference has been made to particular examples embodying the same I wish it to be understood that my invention is not limited to the examples shown in the drawings, and that various changes may be made in the general arrangement of the apparatus and the construction of its parts without departing from my invention.

I claim:

1. In a pipe joint, the combination, with the pipes to be connected having contacting faces, of supporting means for one of said pipes disposed in such a way that axial pressure is exerted by gravity by one of said pipes whereby the contacting faces are forced together, said supporting means comprising cooperating members respectively mounted on said pipes and movable relatively to each other transversely of the pipes, one of said co-operating members being also movable relatively to the pipe on which it is mounted.

2. In a pipe joint the combination, with the pipes formed with cooperating tightening end faces, of a hook connection for said pipes for suspending one from the other with said end faces in tightening engagement and comprising cooperating hook and rack members respectively mounted on said pipes and movable relatively to each other transversely of the pipes.

3. In a pipe joint, the combination, with the pipes formed with cooperating tightening end faces, of a hook connection for said pipes for suspending one from the other with said end faces in tightening engagement and comprising cooperating hook and rack members respectively mounted on said pipes and movable relatively to each other transversely of the pipes, and means to limit the relative movement of said members.

4. In a pipe joint, the combination, with the pipes formed with cooperating tightening end faces, of a hook connection for said pipes for suspending one from the other with said end faces in tightening engagement and comprising cooperating hook and rack members respectively mounted on said pipes, said hook member being mounted on its pipe for being rocked towards and away from said rack member.

5. In a pipe joint, the combination, with the pipes formed with cooperating tightening end faces, of a hook connection for said pipes for suspending one from the other with said end faces in tightening engagement and comprising cooperating members respectively mounted on said pipes and movable relatively to each other transversely and axially of the pipes, and relievable means to lock said members as against axial movement.

6. In a pipe joint, the combination, with the pipes formed with cooperating tightening end faces, of a hook connection for said pipes for suspending one from the other with said end faces in tightening engagement and comprising cooperating hook and rack members respectively mounted on said pipes, a pivot bolt on which said hook member is mounted for rocking into and out of engagement with said rack member and guided in longitudinal slots, and relievable means to fix said pivot bolt in locking position within said slots.

7. In a pipe joint, the combination, with the pipes formed with cooperating tightening end faces, of a hook connection for said pipes for suspending one from the other with said end faces in tightening engagement and comprising cooperating hook and rack members respectively mounted on said pipes, said rack member being mounted for rocking towards and away from said hook member, and relievable means for locking said rack member in position retracted from said hook member, said hook member being mounted for rocking into and out of engagement with said rack member.

In testimony whereof I hereunto affix my signature in the presence of two witnesses.

WALTER KRAUSE.

Witnesses:
 WALTER SPEIR,
 CHARLOTTE UNJER.